United States Patent
Tsutsumi

(10) Patent No.: US 6,982,815 B2
(45) Date of Patent: Jan. 3, 2006

(54) IMAGE READING APPARATUS

(75) Inventor: Kazuyoshi Tsutsumi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 858 days.

(21) Appl. No.: 09/948,640

(22) Filed: Sep. 10, 2001

(65) Prior Publication Data

US 2003/0151778 A1    Aug. 14, 2003

(51) Int. Cl.
*H04N 1/04* (2006.01)
*H02P 8/00* (2006.01)
*G05B 19/40* (2006.01)

(52) U.S. Cl. .................. 358/474; 358/475; 358/496; 358/497; 358/498; 358/488; 318/685; 318/696

(58) Field of Classification Search ............... 358/496, 358/498, 497, 494, 487, 506, 505, 474, 296, 358/488, 401, 501, 412, 468, 475, 509, 471; 399/367, 376, 370–372; 355/407; 271/3.15, 271/3.17, 3.13, 4.02, 4.03, 111, 259, 261; 382/312, 318, 319; 250/234–236; 318/696, 318/685
See application file for complete search history.

(56) References Cited

U.S. PATENT DOCUMENTS 5,523,858 A * 6/1996 Yamada et al. ............. 358/412
5,862,446 A * 1/1999 Hashizume et al. ........ 399/367

FOREIGN PATENT DOCUMENTS

JP    7-123199    5/1995

* cited by examiner

*Primary Examiner*—Cheukfan Lee
(74) *Attorney, Agent, or Firm*—Foley & Lardner LLP

(57) ABSTRACT

An image reading apparatus has a scanner device and an ADF mounted to be openable/closable relative to a document glass which is located on the scanner device. The ADF has a conveying roller for conveying a document past the document glass. The scanner device has a carriage moved along the document glass to allow the scanning of the document set on the document glass and the reading of the image out of the document. Further, the image reading apparatus further has only one motor for driving the conveying roller and for moving the carriage, a clutch for the ADF which is switched to transmit a drive force of the motor to the conveying roller and a clutch for the scanner device which is switched to transmit a drive force of the motor to the carriage.

1 Claim, 3 Drawing Sheets

IMAGE READING APPARATUS

BACKGROUND OF THE INVENTION

The present invention relates to an image reading apparatus having an automatic document feeding device (hereinafter referred to as an ADF) and a scanner device.

Conventionally known is an image reading apparatus having an ADF for feeding a document onto a document glass and a scanner device for reading out an image from the document fed on the document glass.

This image reading apparatus is operated in the following two modes. The first operation mode comprises feeding a document by the ADF onto the document glass, stopping it to a predetermined reading-out position and moving a carriage of the scanner device along the document glass to scan a document surface. The second operation node comprises stopping the carriage of the scanner device to a predetermined reading-out position and conveying the document past the document glass to scan a document surface.

For this reason, the image reading apparatus includes an ADF driving motor on the ADF side and a carriage moving motor on the scanner device side. That is, the image reading apparatus is equipped with two motors.

In the case where the image reading apparatus is operated in the first operation mode or in the second operation mode, the motor for the ADF and motor for the scanner device are not operated simultaneously. That is, either one of the two motors is normally stopped and is not used effectively. For this reason, a resultant image reading apparatus is complicated in structure, heavier in weight and higher in manufacturing cost, thus presenting a problem.

BRIEF SUMMARY OF THE INVENTION

The present invention is achieved with the above in view and the object of the present invention is to provide an image reading apparatus which can be made simpler in structure, lighter in weight and lower in manufacturing cost.

In order to achieve the above-mentioned object, an image reading apparatus of the present invention comprises a document glass which set a document to a predetermined reading-out position, a document conveying mechanism which convey the document past the reading-out position, a scanning/reading-out mechanism moved along the document glass to allow the scanning of the document set to the reading-out position and the reading of an image from the document, only one drive source which drive the document conveying mechanism and scanning/reading-out mechanism, and switching means which allow a drive force from the drive source to be transmitted to any one of the document conveying mechanism and scanning/reading-out mechanism and the selective switching to be made between their transmission paths.

DETAILED DESCRIPTION OF THE INVENTION

An embodiment of the present invention will be described in more detail below with reference to the accompanying drawing.

Figure 1:
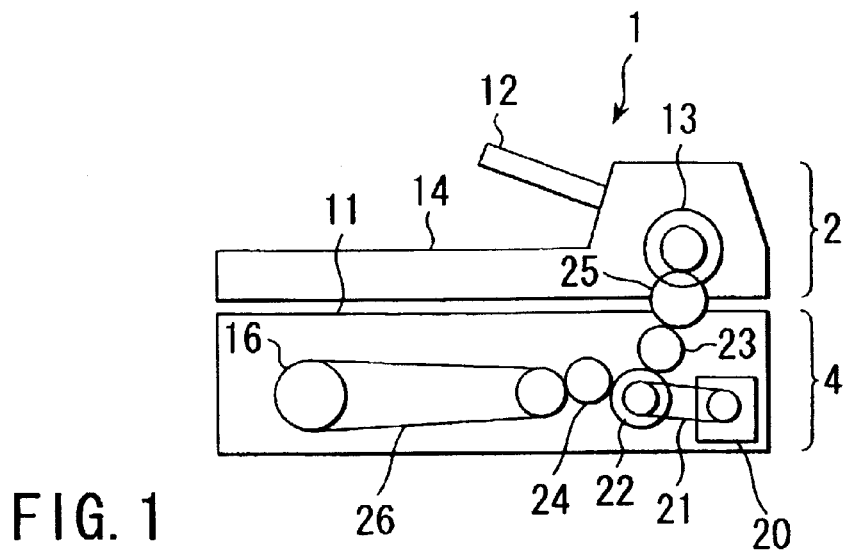
FIG. 1 is a diagrammatic view showing a drive system of an image reading apparatus of the present invention.

FIG. 1 shows a diagrammatic view showing a structure of an image reading apparatus 1 according to an embodiment of the present invention. The image reading apparatus 1 has an automatic document feeding device 2 (first unit) hereinafter referred to as an ADF2 and a scanner device 4 (second unit). The ADF2 is so mounted as to be openable/closable relative to a document glass 11 located on the upper surface side of the scanner device 4.

The ADF2 has a document feeding tray 12 for setting a document as a to-be-read object thereon, a conveying roller 13 (document conveying mechanism) for allowing the document which is taken out from the document feeding tray 2 to be conveyed along the document glass 11, and a document discharging tray 14 for receiving the document discharged from the document glass 11.

The scanner device 4 has a carriage 15 (scanning/reading-out mechanism-see FIG. 5) movable along the document glass 11. The carriage 15 extends in a front/rear direction of the apparatus and has its opposite ends connected by two wires, not shown, and is movable by winding the wire around the pulley 16. The carriage 15 has a light source (not shown) for illuminating the document, a plurality of mirrors (not shown) for transmitting reflection light from the document, and so on. The scanner device 4 has a light receiving element (not shown) for receiving the reflection light from the document transmitted through the carriage 15 and obtaining image data.

The image reading apparatus 1 includes a motor 20 as only one drive source for driving the conveying roller 13 for the ADF2 and a carriage 15 (pulley 16) for the scanner device 4. The motor 20 is incorporated into the scanner device 4. A drive pulley 22 is connected to a drive shaft of the motor 20 through a belt 21. Drive transmission mechanisms 25 and 26 are connected to the drive pulley 22 respectively through clutches 23 and 24 (switching means). The two clutches 23 and 24 are provided on the scanner device 4 side. One (25) of these drive transmission mechanisms 25 transmits a drive force to the conveying roller 13 for the ADF2 and the other drive mechanism 26 transmits a drive force to the pulley 16 for the scanner device 4.

That is, through the switching of the these two clutches 23 and 24 the drive force of the motor 20 can be transmitted selectively to the conveying roller 13 or the pulley 16. It is, therefore, unnecessary according to the present invention to provide two drive motors one on the ADF side and the other on the scanner device side as in the prior art and it is only necessary to provide a single control board for motor driving. As a result, the apparatus can be made simpler in structure, lighter in weight and lower in manufacturing cost.

Figure 2:
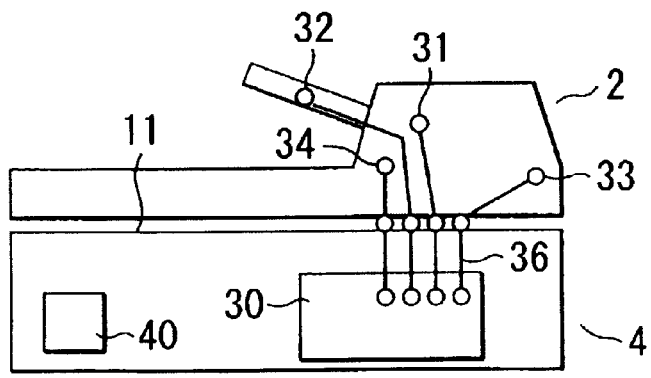
FIG. 2 is a connection line diagram of sensors in an ADF in the image reading apparatus of FIG. 1.

FIG. 2 shows various kinds of sensors mounted on the ADF2. The ADF2 has a sensor 31 for detecting the presence of the document on the document feeding tray 12, a sensor 32 for detecting the size of the document set on the document feeding tray 12, a sensor 33 for taking a timing for feeding the document on the document feeding tray 12, and a sensor 34 for detecting the discharging of the document onto the document discharging tray 14. These four sensors 31 to 34 are connected through optical fiber cables 36 to the control board 30 (control means) incorporated into the scanner device 4.

These optical fiber cables 36 are so connected that their ends exposed on the lower end side of the ADF2 are located opposite to the corresponding ends exposed on the upper end side of the scanner device 4 and these exposed ends of the optical fiber cables 36 are not exposed on the outer sides of the respective units 2 and 4.

That is, the image reading apparatus 1 of the present embodiment includes, in the scanner device 4 side, not only the only one motor 20 but also the single control board 30. It is, therefore, not necessary to provide a power supply and circuit board on the ADF2 side, but it is necessary to connect the sensors 31 to 34 on the ADF2 side to the control board 30. In the present embodiment, therefore, the respective sensors 31 to 34 are connected to the control board 30 by corresponding optical fiber cables 36.

By doing so, any connection lines, such as a power supply cord and sensor cords, connecting together the ADF and scanner device are not exposed on the outer side of the image reading apparatus 1, so that the installation space of the apparatus can be more saved and the apparatus can provide a neat outer appearance. Further, the apparatus can be made simpler in structure, lighter in weight and lower in manufacturing cost.

Figure 3:
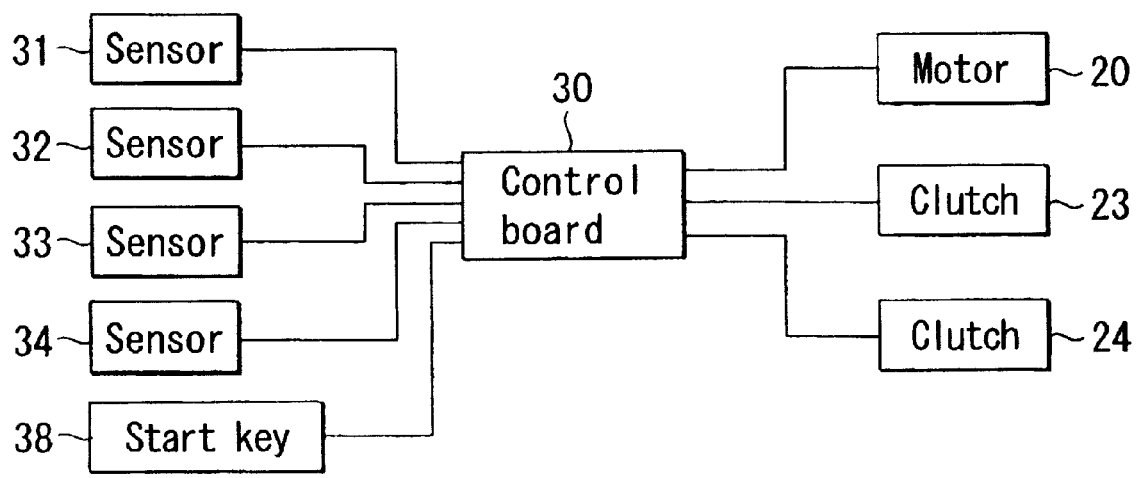
FIG. 3 is a block diagram showing a control system for controlling the operation of the image reading apparatus in FIG. 1.

FIG. 3 is a block diagram showing a control system for controlling the operation of the image reading apparatus 1. In this arrangement, the above-mentioned four sensors 31 to 34, as well as a copy start key 38 provided on an operation section not shown, are connected to the above-mentioned control board 30 of the image reading apparatus 1. Further, the above-mentioned only one motor 20, clutch 23 for the ADF2 and clutch 24 for the scanner device 4 are connected to the control board 30. Further, the image reading apparatus 1 has a power supply 40 on the scanner device 4 side, as shown in FIG. 2, which drives the motor 20 and clutches 23 and 24.

The above-mentioned image reading apparatus 1 is operated in the below-explained two operation modes so as to read out an image on the document.

Figure 4:
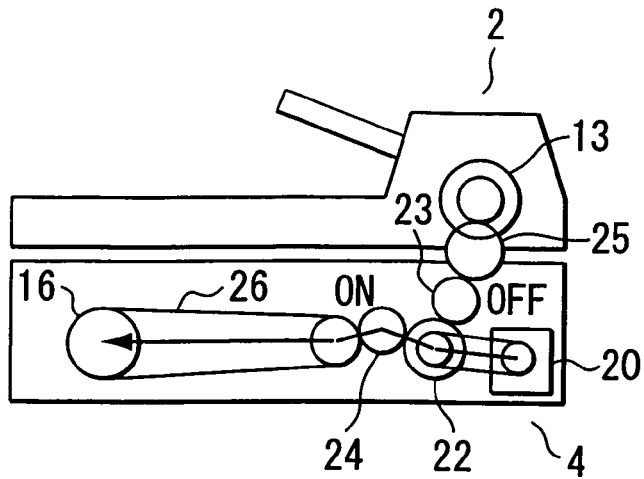
FIG. 4 shows a state in which a drive transmission path is connected to a scanner device side.
Figure 5:
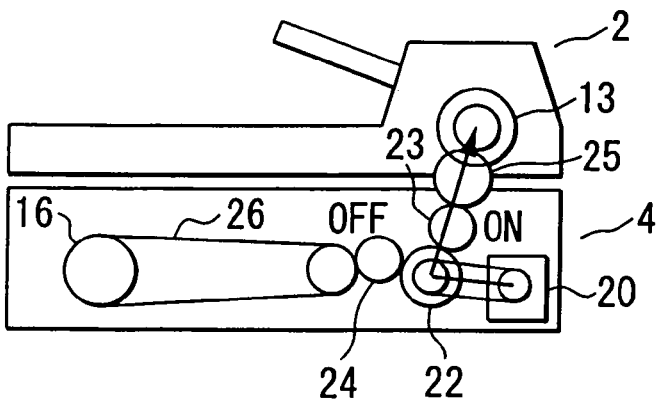
FIG. 5 shows a state in which the scanner device is selectively driven.

In a first operation mode, as shown in FIG. 4, the clutch 23 for the ADF2 is turned OFF and the clutch 24 for the scanner device 4 is turned ON. By doing so, as shown in FIG. 5, the carriage 15 of the scanner device 4 is moved over a document stopped at a predetermined reading-out position on the document glass 11, thus reading an image from the document.

Figure 6:
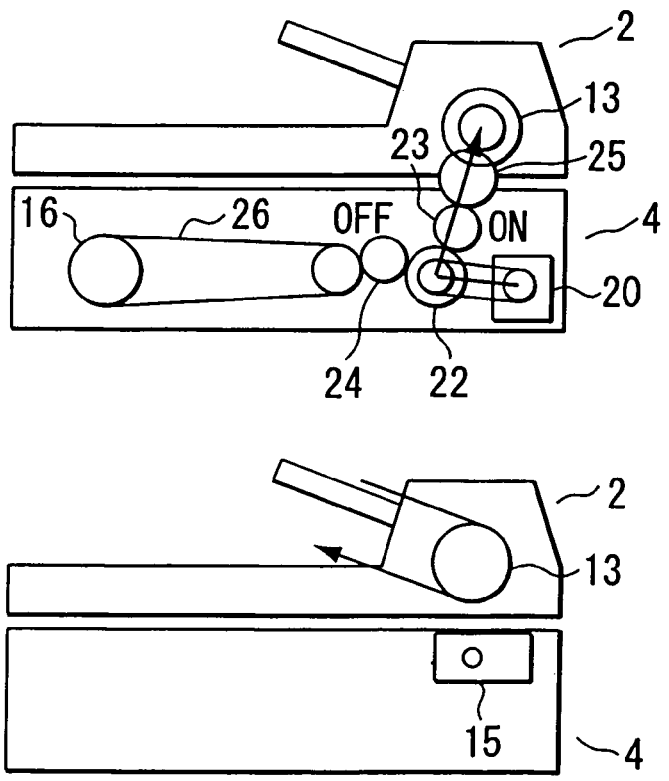
FIG. 6 shows a view showing a state in which a drive transmission path is connected to the ADF side.
Figure 7:
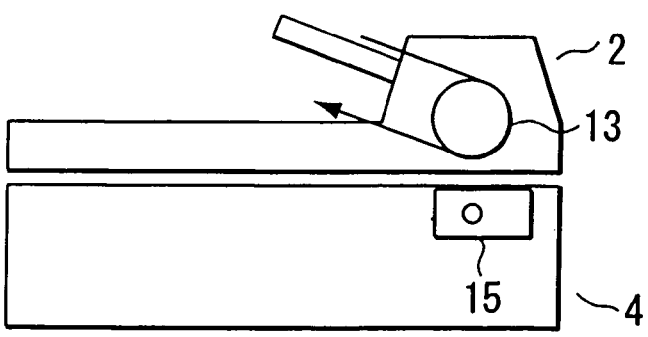
FIG. 7 shows a view showing a state in which the ADF is selectively driven.

In a second operation mode, as shown in FIG. 6, the clutch for the scanner device 4 is turned OFF and the clutch 23 for the ADF2 is turned ON. By doing so, as shown in FIG. 7, relative to the carriage 15 stopped to a predetermined position, a document is conveyed past the document glass 11 and the scanning of the document is performed to read out an image from the document.

Figure 8:
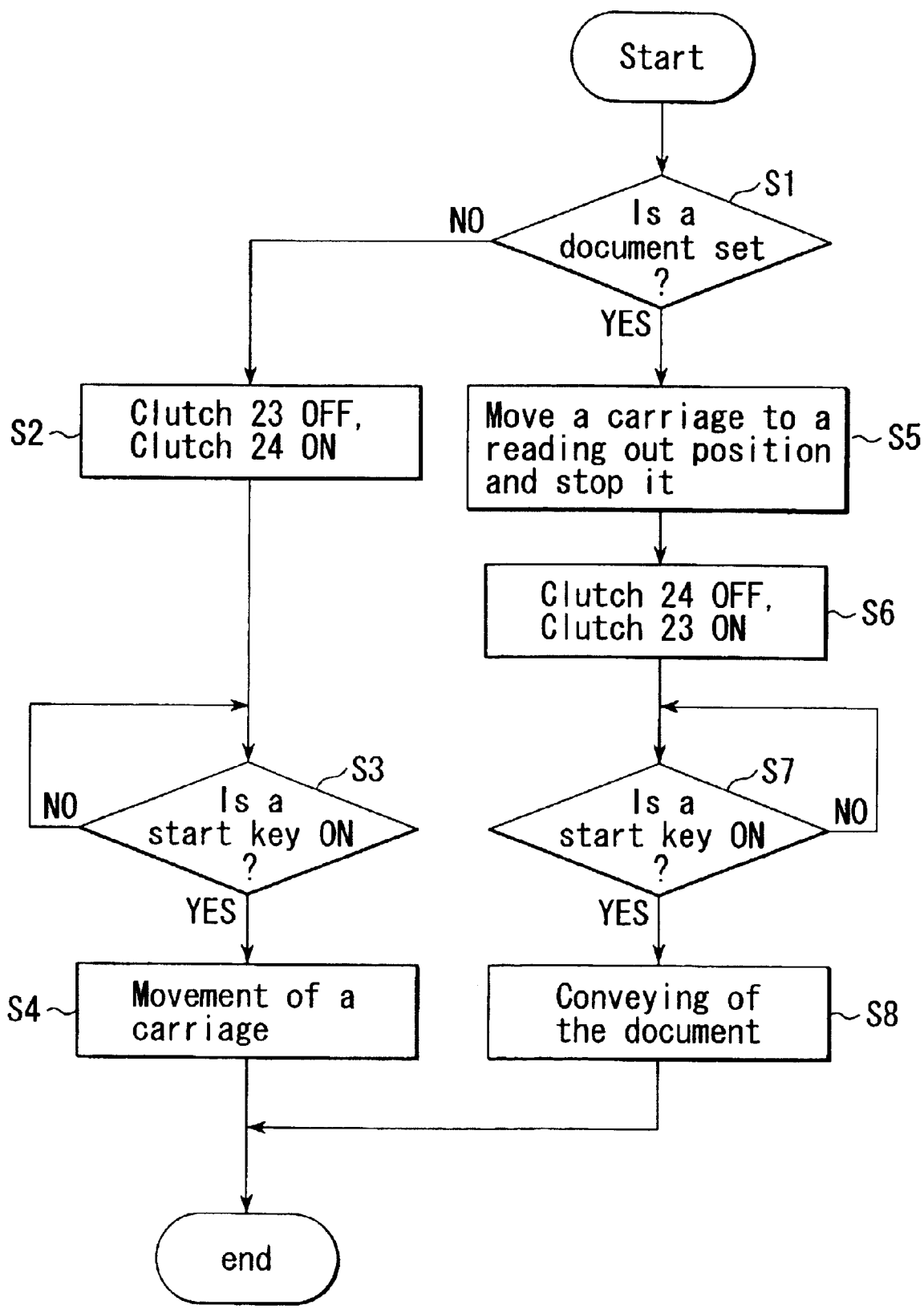
FIG. 8 is a flow chart for explaining the operation of the image reading apparatus.

Now, an explanation will be made about the image reading-out operation on the image reading apparatus 1 of the above-mentioned structure by referring to a flow chart of FIG. 8.

After the power supply of the image reading apparatus 1 has been turned ON, the output of the sensor 31 is monitored to see whether or not the document is set on the document feeding tray 12 (step 1). If the document feeding tray 12 is in a standby state (step 1:NO) in which any document is not set on the document feeding tray 12, the above-mentioned first operation mode is selected and, by opening or closing the ADF2 relative to the document glass 11 for example, the first operation mode is determined.

When the first operation mode is determined, the clutch 23 for the ADF2 is turned OFF and the clutch 24 for the scanner device 4 is turned ON (step 2). If, in this state, a document is set to a predetermined reading-out position on the document glass 11 and the copy start key 38 is turned ON (step 3: YES), the motor 20 is driven to transmit a drive force through the drive transmission mechanism 26 and rotate the pulley 16 to allow the carriage 15 to be moved (step 4). By doing so, the scanning of the document is started to allow an image to be read out. After the image has been read out, the carriage 15 is returned back to an original position.

If it is decided at step 1 that a document is set on the document feeding tray 12 (step 1:YES), switching is automatically made to the second operation mode. In the second operation mode, first the carriage 15 is moved to a predetermined position, that is, to an image readable position where it is stopped (step 5).

Then, the clutch 24 for the scanner device 4 is turned OFF and the clutch 23 for the ADF2 is turned ON (step 6). If, in this state, the copy start key 38 is turned ON (step 7:YES), the motor 20 is driven to transmit a drive force through the drive transmission mechanism 25 and rotate the conveying roller 13 to allow the document to be conveyed past the document glass 11 (step 8). By doing so, the scanning of the document is started and an image is read out from the document.

If, after the reading of the image, the sensor 31 detects no presence of the document on the document feeding tray 12, then the second operation mode is released and switching is made to the first operation mode.

As set out above, according to the present invention, a motor for operating the ADF2 and motor for operating the scanner device 4 can be replaced by only one shared motor and a single control board can be used to control motor driving and it is not necessary to provide any power supply cord for supplying power to the ADF2 side. For this reason, the apparatus can be made simpler in structure, lighter in weight and lower in manufacturing cost.

The present invention is not restricted to the above-mentioned embodiment and various changes or modifications of the present invention can be made within the spirit and scope of the present invention. Although, in the above-mentioned embodiment, the two clutches are connected to one motor to allow the switching to be made between their drive force transmission paths and the selective driving to be made between the ADF2 and the scanner device 4, it is possible to omit these two clutches. In this case, it is only necessary to rotate the conveying roller 13 for the ADF2 in a predetermined direction when the motor 20 is rotated in one direction and move the carriage 15 in a predetermined direction when the motor 20 is rotated in the other direction. In this case, however, when the carriage 15 is moved in the reverse direction, the conveying roller 13 is also rotated.

What is claimed is:

1. An image reading apparatus comprising:
   a document glass which supports a document at a predetermined reading-out position;

a document conveying mechanism which conveys the document past the reading-out position;

a scanning/reading-out mechanism moved along the document glass to scan the document set to the reading-out position and read out an image from the document;

only one drive source which drives the document conveying mechanism and scanning/reading-out mechanism;

switching means which allows a drive force from the drive source to be transmitted to any one of the document conveying mechanism and scanning/reading-out mechanism and selective switching to be made between their drive force transmission paths; and control means which operates the image reading apparatus in a first mode for operating the scanning/reading-out mechanism to allow the scanning of the document set to the reading-out position and the reading of an image out of the document or in a second mode for stopping the scanning/reading-out mechanism to a predetermined position and operating the document conveying mechanism to allow the scanning of the document and the reading of the image out of the document;

wherein a first unit and a second unit are provided, the first unit including said document conveying mechanism and the second unit being separated from the first unit, having the scanning/reading-out mechanism and including said drive source and said control means, wherein said image reading apparatus further comprises:

at least one sensor which detects the document in the first unit, wherein each sensor is connected to said control means by a corresponding optical fiber cable not exposed on the outer sides the first and second units wherein each of the corresponding fiber cables includes a first optical fiber cable disposed within the first unit and a second optical fiber cable disposed within the second unit, wherein the first and optical fiber cables are attached to each other.

* * * * *